(12) United States Patent
Zhou et al.

(10) Patent No.: US 7,194,455 B2
(45) Date of Patent: Mar. 20, 2007

(54) METHOD AND SYSTEM FOR RETRIEVING CONFIRMING SENTENCES

(75) Inventors: Ming Zhou, Beijing (CN); Hua Wu, Beijing (CN); Yue Zhang, Beijing (CN); Jianfeng Gao, Beijing (CN); Chang-Ning Huang, Beijing (CN)

(73) Assignee: Microsoft Corporation, Redmond, WA (US)

( * ) Notice: Subject to any disclaimer, the term of this patent is extended or adjusted under 35 U.S.C. 154(b) by 467 days.

(21) Appl. No.: 10/247,596

(22) Filed: Sep. 19, 2002

(65) Prior Publication Data

US 2004/0059718 A1    Mar. 25, 2004

(51) Int. Cl.
*G06F 17/30* (2006.01)
(52) U.S. Cl. .................. 707/3; 704/4; 704/9; 704/10
(58) Field of Classification Search .................. 707/3, 707/4, 6; 704/1–10, 200
See application file for complete search history.

(56) References Cited

U.S. PATENT DOCUMENTS

| | | | |
|---|---|---|---|
| 5,060,155 A | 10/1991 | Van Zuijlen .................. | 704/9 |
| 5,761,631 A | 6/1998 | Nasukawa ..................... | 704/9 |
| 5,933,822 A | 8/1999 | Braden-Harder et al. ...... | 707/5 |
| 5,963,940 A | 10/1999 | Liddy et al. | |
| 6,064,951 A | 5/2000 | Park et al. ..................... | 704/8 |
| 6,081,774 A | 6/2000 | de Hita et al. .................. | 704/9 |
| 6,246,977 B1 * | 6/2001 | Messerly et al. ............... | 704/9 |
| 6,321,189 B1 | 11/2001 | Masuichi et al. ............... | 704/7 |
| 6,366,908 B1 | 4/2002 | Chong et al. .................. | 707/3 |

(Continued)

FOREIGN PATENT DOCUMENTS

JP    04170460    6/1992

(Continued)

OTHER PUBLICATIONS

Zhou, M., "Search/QA-related Research in MSR Asia", 19th International Conference on Computational Linguistics, COLING 2002, Workshop On Multilingual Summarization and Question Answering, Aug. 31, 2002, no p. No. (35 pages).

(Continued)

*Primary Examiner*—Alford Kindred
*Assistant Examiner*—Hanh Thai
(74) *Attorney, Agent, or Firm*—John D. Veldhuis-Kroeze; Westman, Champlin & Kelly, P.A.

(57) ABSTRACT

A method, computer readable medium and system are provided which retrieve confirming sentences from a sentence database in response to a query. A search engine retrieves confirming sentences from the sentence database in response to the query. IN retrieving the confirming sentences, the search engine defines indexing units based upon the query, with the indexing units including both lemma from the query and extended indexing units associated with the query. The search engine then retrieves a plurality of sentences from the sentence database using the defined indexing units as search parameters. A similarity between each of the plurality of retrieved sentences and the query is determined by the search engine, wherein each similarity is determined as a function of a linguistic weight of a term in the query. The search engine then ranks the plurality of retrieved sentences based upon the determined similarities.

20 Claims, 10 Drawing Sheets

U.S. PATENT DOCUMENTS

| | | | |
|---|---|---|---|
| 6,473,729 B1 | 10/2002 | Gastaldo et al. | 704/4 |
| 6,622,123 B1 | 9/2003 | Chanod et al. | 704/277 |
| 6,778,979 B2 | 8/2004 | Grefenstette et al. | |
| 6,810,376 B1* | 10/2004 | Guan et al. | 704/9 |
| 6,862,566 B2 | 3/2005 | Wakita et al. | 704/2 |
| 2002/0111792 A1 | 8/2002 | Chemy | 704/8 |
| 2003/0004915 A1* | 1/2003 | Lin et al. | 707/1 |
| 2004/0059564 A1 | 3/2004 | Zhou | |
| 2004/0059730 A1 | 3/2004 | Zhou | |
| 2005/0273318 A1 | 12/2005 | Zhou | |
| 2006/0142994 A1 | 6/2006 | Zhou | |

FOREIGN PATENT DOCUMENTS

| | | |
|---|---|---|
| JP | 08254206 | 9/1996 |
| WO | WO 01/82119 A2 | 11/2001 |

OTHER PUBLICATIONS

Liu et al., "PENS: A Machine-aided English Writing System for Chinese Users", 38th Annual Meeting of the Association for Computational Linguistics, ACL-2000, Hong Kong, Oct. 1, 2000, no p. No. (8 pages).

Zhou, M. "Improving Translation Selection with a New Translation Model Trained by Independent Monolingual Corpora", *Computational Linguistics and Chinese Language Processing*, vol. 6, No. 2, Feb. 2002, pp. 1-21.

Brown, P.F.; et al. "The Mathematics of Statistical Machine Translation: Parameter Estimation", *Computational Linguistics*, vol. 19, No. 2, Jun. 1993, pp. 263-311.

Tanaka, K.; "Extraction of Lexical Translation from Non-Aligned Corpora", *COLING-96: The 16th International Conference on Computational Linguistics*, Copenhagen, Denmark, Aug. 1996, pp. 580-585.

Dagan, I.; et al. "TERMIGHT: Identifying and Translating Technical Terminology", 4th *Conference on Applied Natural Language Processing*, 1994, pp. 33-40.

Dagan, I.; et al. "Word Sense Disambiguation Using a Second Language Monolingual Corpus", *Computational Linguistics*, vol. 20, No. 4, Dec. 1994, pp. 563-569.

Fung, P. "A Pattern Matching Method for Finding Noun and Proper Noun Translations from Noisy Parallel Corpora", 33rd *Annual Conference of the Association for Computational Linguistics*, 1998, pp. 236-243.

Fung, P.; et al. "An IR Approach for Translating New Words from Nonparallel, Comparable Texts", COLING—ACL '98, *36th Annual Meeting of the Association for Computational Linguistics and 17th International Conference on Computational Linguistics*, Aug. 1998, pp. 414-420.

Koehn, P.; et al. "Estimating Word Translation Probabilities from Unrelated Monolingual Corpora Using the EM Algorithm", *National Conference on Artificial Intelligence (AAAI)*, 2000, pp. 711-715.

Lin, D. "Principle-Based Parsing Without Overgeneration", *Proceedings of ACL-93*, 1993, pp. 112-120.

Lin, D. "Principar—An Efficient, Broad-coverage, Principle-based Parser", *COLING 94, The 15th International Conference on Computational Linguistics*, Aug. 1994, pp. 482-488.

Lin, D. "Extracting Collocations from Text Corpora", *First Workshop on Computational Terminology*, 1998.

Lin, D. "Automatic Retrieval and Clustering of Similar Words", *COLING-ACL '98, 36th Annual Meeting of the Association for Computational Linguistics and 17th International Conference on Computational Linguistics*, Aug. 1998, pp. 768-774.

McKeown, K. R.; et al. "Collocations", *Handbook of Natural LanguageProcessing*, 2000, pp. 507-523.

Mooney, R. "Comparative Experiments on Disambiguating Word Senses: All Illustration of the Role of Bias in Machine Learning", *Proceedings of the Conference on Empirical Methods in Natural Language Processing, EMNLP*, May 1996, pp. 82-91.

Smadja, F.; et al. "Translation Collocations for Billingual Lexicons: A Statistical Approach", *Computational Linguistics*, vol. 22, No. 1, Mar. 1996, pp. 1-38.

Schutze, H. "Automatic Word Sense Discrimination", *Computational Linguistics*, vol. 24, No. 1, Mar. 1998, pp. 97-123.

Wu, D. "Learning an English-Chinese Lexicon From a Parallel Corpus", *Proceedings of the First Conference of the First Conference of the Association for Machine Translation in the Americas*, Oct. 1994, pp. 206-213.

Yarowsky, D. "Unsupervised Word Sense Disambiguation Rivaling Supervised Methods", 33rd *Annual Meeting of the Association for Computation Linguistics*, Jun. 1995, pp. 189-196.

Zhou, M. "A Block-Based Robust Dependency Parser for Unrestricted Chinese Text", 2nd *Workshop on Chinese Language Processing*, 2000, pp. 78-84.

Office Action dated Jul. 17, 2006 for U.S. Appl. No. 10/247,684, filed Sep. 19, 2002.

Office Action dated Jun. 2, 2005 for U.S. Appl. No. 10/247,595, filed Sep. 19, 2002.

Official Communication from EPO in European Patent Application No. 03 019 758.6 dated Jul. 11, 2005.

Notice of Allowance dated Nov. 16, 2006 for U.S. Appl. No. 10/247,684, filed Sep. 19, 2002.

Office Action dated Sep. 8, 2006 for U.S. Appl. No. 10/247,595, filed Sep. 19, 2002.

* cited by examiner (have, sub, I), (I, sub-of, have), (have, obj, dog), (dog, obj-of, have), (dog, adj, brown), (brown, adj-of, dog), (dog, det, a), (dog, det-of, a)¹

(颁布, sub, 国家), (国家, sub-of, 颁布), (颁布, obj, 计划), (计划, obj-of, 颁布), (颁布, comp, 了), (了, comp-of, 颁布)

METHOD AND SYSTEM FOR RETRIEVING CONFIRMING SENTENCES

CROSS-REFERENCE TO RELATED APPLICATIONS

Reference is hereby made to the following co-pending and commonly assigned patent applications filed on Sep. 19, 2002: U.S. application Ser. No. 10/247,595 entitled "METHOD AND SYSTEM FOR DETECTING USER INTENTIONS IN RETRIEVAL OF HINT SENTENCES" and U.S. application Ser. No. 10/247,684 entitled "METHOD AND SYSTEM FOR RETRIEVING HINT SENTENCES USING EXPANDED QUERIES" both for inventor Ming Zhou.

BACKGROUND OF THE INVENTION

The present invention relates to machine aided writing systems and methods. In particular, the present invention relates to systems and methods for aiding users in writing in non-native languages.

With the rapid development of global communications, the ability to write in English and other non-native languages is becoming more important. However, non-native speakers (for example, people who speak Chinese, Japanese, Korean or other non-English languages) often find it very difficult to write in English. The difficulty is frequently not in spelling, nor in grammar, but in idiomatic usage. Therefore, the biggest problem for these non-natives while writing in English is determining how to polish sentences. While this can be true regarding the process of writing in any non-native language, the problem is described primarily with reference to English writing.

Spelling check and grammar check are helpful only when the user misspells a word or makes an obvious grammar mistake. These checking programs cannot be depended on for help in polishing sentences. A dictionary can be helpful as well, but mostly only for resolving reading and translation issues. Normally, looking up a word in a dictionary provides the writer with multiple explanations about the usages of the word, but without contextual information. As a result, it's too confusing and time-consuming for users to get any solution.

Generally, writers find it very helpful to have good example sentences available while writing for reference in polishing sentences. The problem is that those example sentences are hardly available at hand. In addition, up to now, no effective software has existed that supports English polish, and it is believed that few researchers have ever worked on this area.

There are numerous challenges to realizing a system capable of aiding users in polishing English sentences. First, given a user's sentence, it must be determined how to retrieve confirming sentences. Confirming sentences are used to confirm the user's sentences. Confirming sentences should be close in sentence structure or form to the user's input query or intended input query. Given a limited example base, it is hard to retrieve totally similar sentences, so it is typically only possible to retrieve sentences containing some similar parts to the sentence being written (the query sentence). Then, two interrelated questions arise. The first question is that if the user's sentence is too long and complex, which part should be taken as the user's focus? The second question is that if a large number of sentences are matched, how can or should they be ranked precisely and efficiently in order to maximize their usefulness to the writer?

A second challenge is determining how to retrieve hint sentences. Hint sentences are used to provide expanded expressions. In other words, hint sentences should be similar in meaning to the user's input query sentence, and are used to provide the user with alternate ways to express a particular idea. A more complicated case is determining how to detect the user's real intention, in order to retrieve appropriate hint sentences, when the user's sentence contains confusing expressions, or even if the user's sentence is written in English but employs a sentence structure or grammar appropriate for another language (for example, a "Chinese-like English sentence"). A third challenge relates to the fact that a user may search with a query written in his or her native language. To realize a precise translation, query understanding and translation selection are two big technical obstacles.

Although the aforementioned problems are described with reference to English language writing by people for whom English is not their native language (for example, native Chinese, Japanese or Korean speaking people), these problems are common for people who are writing in a first (non-native) language, but who are native speakers of a second (native) language. In light of these problems, or others not discussed, a system or method which aids non-native speakers in writing in English or other non-native languages by providing relevant confirming and/or hint sentences would be a significant improvement in the art.

SUMMARY OF THE INVENTION

A method, computer readable medium and system are provided which retrieve confirming sentences from a sentence database in response to a query. The confirming sentences are used to confirm or guide the user's sentence structure while writing. Therefore, confirming sentences should be close in sentence structure or form to the user's input query or intended input query in order to serve as a grammatical example.

A search engine retrieves confirming sentences from the sentence database in response to the query. The query is received and indexing units are defined, based upon the query, with the indexing units including both lemma from the query and extended indexing units associated with the query. Sentences from the sentence database are retrieved by the search engine using the defined indexing units as search parameters.

A ranking component of the search engine determines a similarity between each of the retrieved confirming sentences and the query. The similarity is determined as a function of a linguistic weight of a term in the query. The linguistic weight of the term in the query is a weight assigned to the term in the query as a function of its part of speech. The ranking component then ranks the retrieved confirming sentences based upon the determined similarities.

In some embodiments, each similarity is further determined as a function of a sentence length factor corresponding to a length of the corresponding confirming sentence.

BRIEF DESCRIPTION OF THE DRAWINGS

FIGS. 4-1 and 4-2 are examples of dependency triples for an English language query and a Chinese language query, respectively.

FIG. 5-1 is a block diagram illustrating a method of creating a dependency triples database.

FIG. 5-2 is a block diagram illustrating a query expansion method which provides alternative expressions for use in searching a sentence database.

FIG. 6-1 is a block diagram illustrating a translation method of detecting a user's input query intentions.

FIG. 6-2 is a block diagram illustrating a method of constructing a confusion set database.

FIG. 6-3 is a block diagram illustrating a confusion set method of detecting a user's input query intentions.

DETAILED DESCRIPTION OF ILLUSTRATIVE EMBODIMENTS

The present invention provides an effective system which helps users write in a non-native language and polish their sentences by referring to suggestive sentences. The suggestive sentences, which can be confirming sentences and hint sentences, are retrieved automatically from a sentence database using the user's sentences as queries. To realize this system, several technologies are proposed. For example, a first is related to improved example sentence recommendation methods. A second is related to improved cross-lingual information retrieval methods and technology which facilitate searching in the user's native language others are also proposed.

Figure 1:
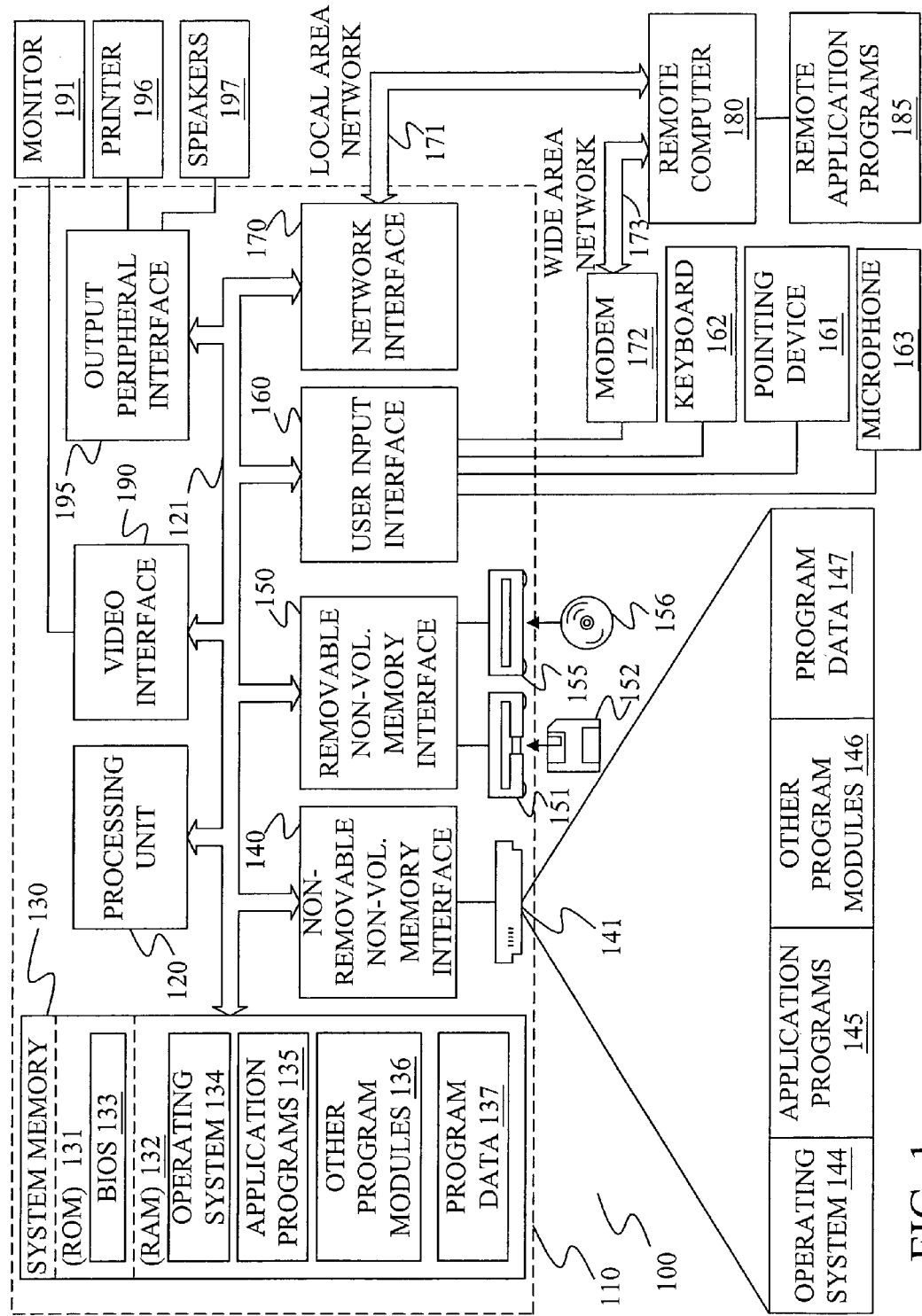
FIG. 1 is a block diagram of one computing environment in which the present invention may be practiced.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well-known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general-purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

Figure 2:
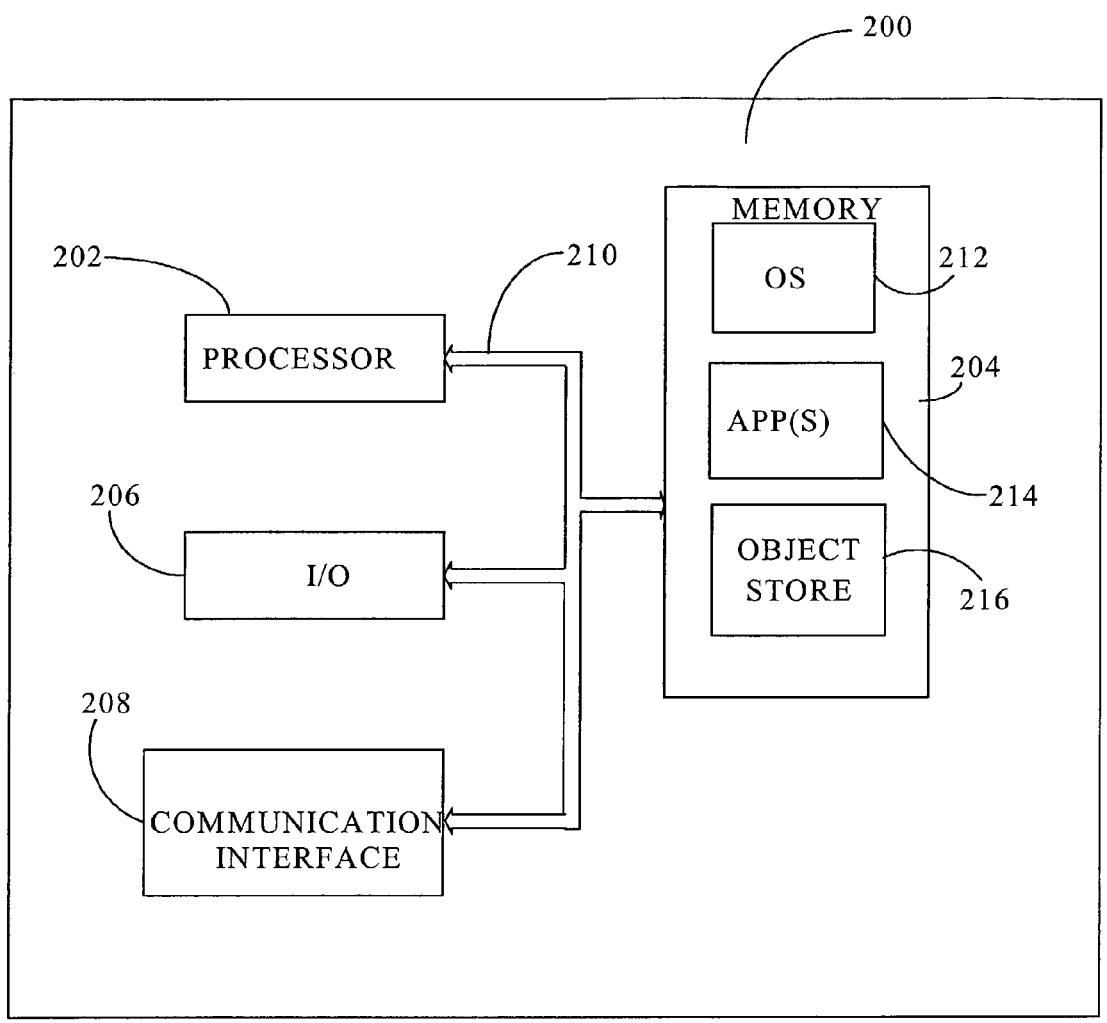
FIG. 2 is a block diagram of an alternative computing environment in which the present invention may be practiced.

FIG. 2 is a block diagram of a mobile device 200, which is an exemplary computing environment. Mobile device 200 includes a microprocessor 202, memory 204, input/output (I/O) components 206, and a communication interface 208 for communicating with remote computers or other mobile devices. In one embodiment, the afore-mentioned components are coupled for communication with one another over a suitable bus 210.

Memory 204 is implemented as non-volatile electronic memory such as random access memory (RAM) with a battery back-up module (not shown) such that information stored in memory 204 is not lost when the general power to mobile device 200 is shut down. A portion of memory 204 is preferably allocated as addressable memory for program execution, while another portion of memory 204 is preferably used for storage, such as to simulate storage on a disk drive.

Memory 204 includes an operating system 212, application programs 214 as well as an object store 216. During operation, operating system 212 is preferably executed by processor 202 from memory 204. Operating system 212, in one preferred embodiment, is a WINDOWS® CE brand operating system commercially available from Microsoft Corporation. Operating system 212 is preferably designed for mobile devices, and implements database features that can be utilized by applications 214 through a set of exposed application programming interfaces and methods. The objects in object store 216 are maintained by applications 214 and operating system 212, at least partially in response to calls to the exposed application programming interfaces and methods.

Communication interface 208 represents numerous devices and technologies that allow mobile device 200 to send and receive information. The devices include wired and wireless modems, satellite receivers and broadcast tuners to name a few. Mobile device 200 can also be directly connected to a computer to exchange data therewith. In such cases, communication interface 208 can be an infrared transceiver or a serial or parallel communication connection, all of which are capable of transmitting streaming information.

Input/output components 206 include a variety of input devices such as a touch-sensitive screen, buttons, rollers, and a microphone as well as a variety of output devices including an audio generator, a vibrating device, and a display. The devices listed above are by way of example and need not all be present on mobile device 200. In addition, other input/output devices may be attached to or found with mobile device 200 within the scope of the present invention.

In accordance with various aspects of the present invention, proposed are methods and systems which provide practical tools for assisting English writing for non-natives. The invention does not focus on assisting the user with spelling and grammar, but instead focuses on sentence polish assistance. Generally, it is assumed that users who need to write in English from time to time must have basic knowledge of English vocabulary and grammar. In other words, the users have some ability to discern good sentences from bad sentences, given a choice.

The approach used with embodiments of the invention is to provide appropriate sentences to the user, whenever and whatever he or she is writing. The scenario is very simple: Whenever a user writes a sentence, the system detects his or her intention, and provides some example sentences. Then, the user polishes his or her sentences by referring to the example sentences. This technology is called "intelligent recommendation of example sentences".

Figure 3:
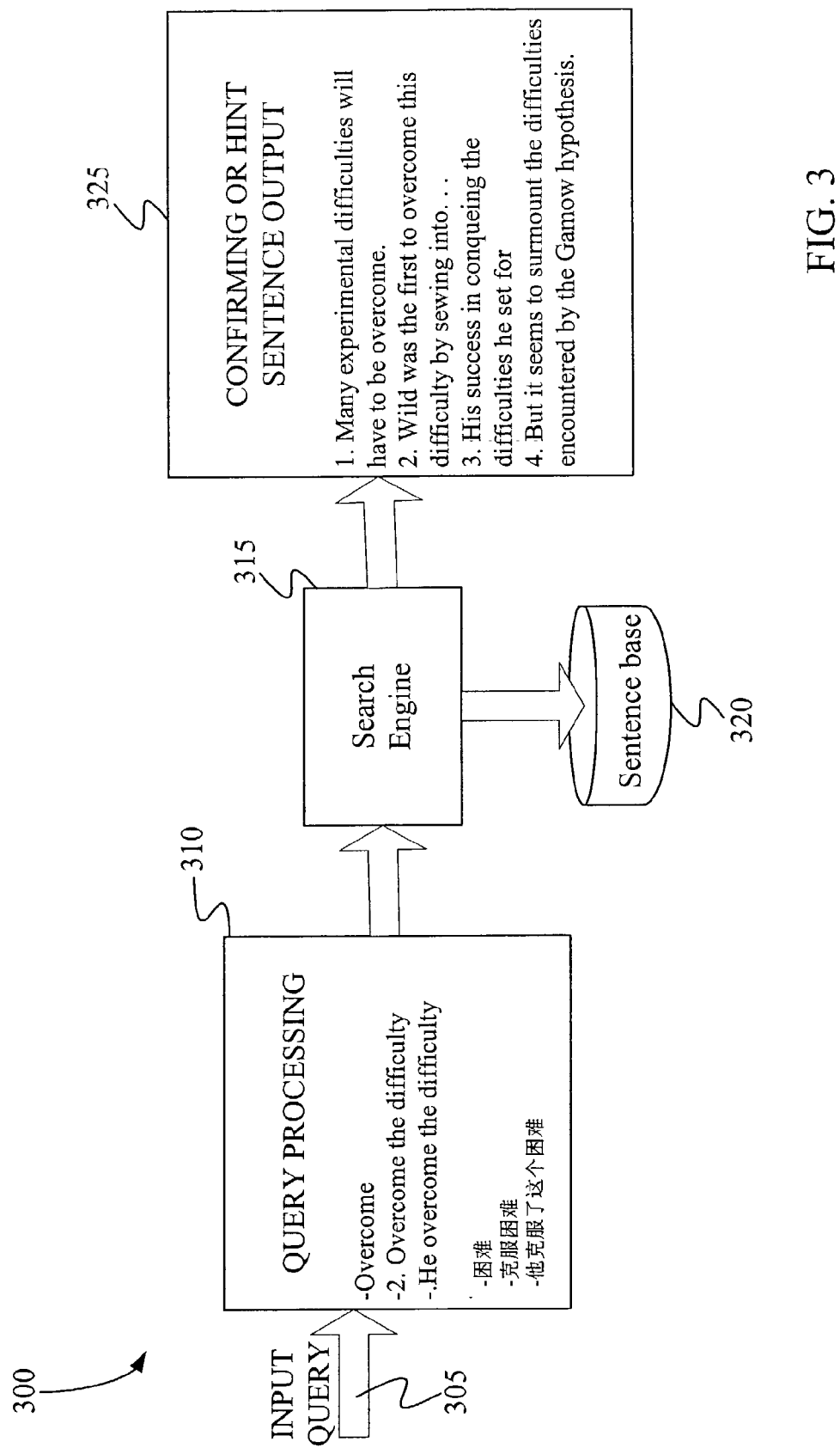
FIG. 3 is a block diagram illustrating a system and method of the present invention which aid a user in constructing and polishing English sentences.

FIG. 3 is the block diagram illustrating a system and method of the present invention which aid a user in constructing and polishing English sentences. More generally, the system and method aid a user in constructing and polishing sentences written in a first language, but by way of example the invention is described with reference to English language sentence polish. The system 300 includes an input 305 which is used to receive or enter an input query into the system. The input query can be in a variety of forms, including partial or whole English sentences, partial or whole Chinese sentences (or more generally sentences in a second language), and even in a form which mixes words from the first language with sentence structure or grammar from the second language (for example, "Chinese-like English").

A query processing component 310 provides the query, either in whole or in related component parts, to search engine 315. Search engine 315 searches a sentence database 320 using the query terms, or information generated from the query terms. In embodiments in which the entire input query is provided to search engine 315 for processing and searching, query processing component 310 can be combined with input 305. However, in some embodiments, query processing component 310 can perform some processing functions on the query, for example extracting terms from the query and passing the terms to search engine 315. Further, while the invention is for the most part described with reference to methods implemented in whole or in part by search engine 315, in other embodiments, some or all of the methods can be implemented partially within component 310.

The database 320 contains a large number of example sentences extracted from standard English documents. The search engine 315 retrieves user-intended example sentences from the database. The example sentences are ranked by the search engine 315, and are provided at a sentence output component 325 for reference by the user in polishing his or her written sentences.

The user enters a query by writing something in a word processing program running on a computer or computing environment such as those shown in FIGS. 1 and 2. For example, he or she may input one single word, or a phrase, or a whole sentence. Sometimes, the query is written in his or her native language, even though the ultimate goal is to write a sentence in the first or non-native language (e.g., English). The user's input will be handled as a query to the search engine 315. The search engine searches the sentence base 320 to find relevant sentences. The relevant sentences are categorized into two classes: confirming sentences and hint sentences.

Confirming sentences are used to confirm or guide the user's sentence structure, while the hint sentences are used to provide expanded expressions. Confirming sentences should be close in sentence structure or form to the user's input query or intended input query in order to serve as a grammatical example. Hint sentences should be similar in meaning to the user's input query, and are used to provide the user with alternate ways to express a particular idea. Aspects of the present invention are implemented in the search engine component 315 as is described below. However, certain aspects of the present invention can be implemented in query processing component 310 in other embodiments. Notice that although the invention is described in the context of Chinese and English, the invention is language independent and can be extended easily to other languages.

To provide solutions to one or more of the previously discussed challenges, system 300 and the methods it implements utilize a natural language processing-enabled (NLP-enabled) cross language information retrieval design. It uses a conventional information retrieval (IR) model as a baseline, and applies NLP technology to improve retrieval precision.

The Baseline System

The baseline system upon which search engine 315 improves is an approach used widely in traditional IR systems. A general description of one embodiment of this approach is as follows.

The whole collection of example sentences denoted as D consists of a number of "documents," with each document actually being an example sentence in sentence database 320. The indexing result for a document (which contains only one sentence) with a conventional IR indexing approach can be represented as a vector of weights as shown in Equation 1:

$$D_i \rightarrow (d_{i1}, d_{i2}, \ldots, d_{im}) \qquad \text{Equation 1}$$

where $d_{ik}$ ($1 \leq k \leq m$) is the weight of the term $t_k$ in the document $D_i$, and m is the size of the vector space, which is determined by the number of different terms found in the collection. In an example embodiment, terms are English words. The weight $d_{ik}$ of a term in a document is calculated according to its occurrence frequency in the document (tf—term frequency), as well as its distribution in the entire collection (idf—inverse document frequency). There are multiple methods of calculating and defining the weight $d_{ik}$ of a term. Here, by way of example, we use the relationship shown in Equation 2:

$$d_{ik} = \frac{[\log(f_{ik}) + 1.0] * \log(N/n_k)}{\sqrt{\sum_j [(\log(f_{jk}) + 1.0) * \log(N/n_k)]^2}} \qquad \text{Equation 2}$$

where $f_{ik}$ is the occurrence frequency of the term $t_k$ in the document $D_i$, N is the total number of documents in the collection, and $n_k$ is the number of documents that contain the term $t_k$. This is one of the most commonly used TF-IDF weighting schemes in IR.

As is also common in TF-IDF weighting schemes, the query Q, which is the user's input sentence, is indexed in a similar way, and a vector is also obtained for a query as shown in Equation 3:

$$Q_j \rightarrow (q_{j1}, q_{j2}, \ldots, q_{jm}) \qquad \text{Equation 3}$$

The similarity $\text{Sim}(D_i, Q_j)$ between a document (sentence) $D_i$ in the collection of documents and the query sentence $Q_j$ can be calculated as the inner product of their vectors, as shown in Equation 4:

$$Sim\ (D_i, Q_j) = \sum_k (d_{ik} * q_{jk})$$ Equation 4

NLP-Enabled Cross Language Information Retrieval Design

In addition to, or instead of, using a baseline approach to sentence retrieval such as the one described above, search engine 315 builds upon that approach by using an NLP-enabled cross language information retrieval method or approach. The NLP technology methodology improves retrieval precision, as explained below. To enhance the retrieval precision, system 300 utilizes, alone or in combination, two extended indexing unit methods. First, to reflect the linguistic significance in constituting a sentence, different types of indexing units are assigned different weights. Second, to enhance hint sentence retrieval, a new approach is employed. For a query sentence, all of the words are replaced with their similar or related words, for example synonyms from a thesaurus. Then, a dependency triple database is used to filter illegal collocations in order to remove possible noisy expansions.

To improve query translation in search engine 315 (or in component 310) a new dependency triple based translation model is employed. First, the main dependency triples are extracted from the query, then translation based on those triples is performed. A discussion of the dependency triples database is provided below.

Dependency Triple Database

A dependency triple consists of a head, a dependent, and a dependency relation between the head and the dependant. Using a dependency parser, a sentence is analyzed into a set of dependency triples trp in a form such as illustrated in Equation 5:

$$trp = (w_1, rel, w_2)$$ Equation 5

Figures 1, 2, 4:
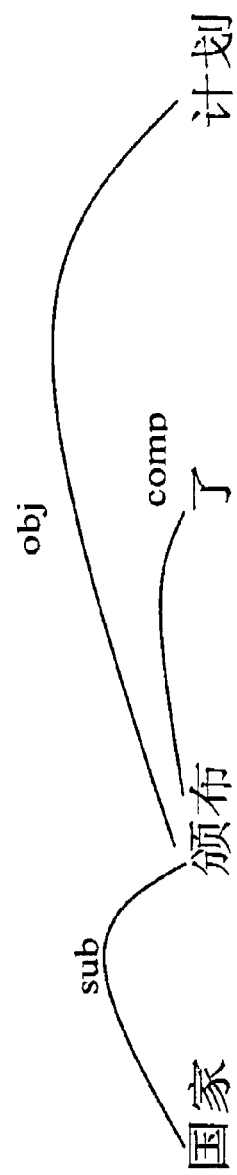

For example, for an English sentence "I have a brown dog", a dependency parser can get a set of triples as is illustrated in FIG. 4-1. The standard expression of the dependency parsing result is: (have, sub, I), (have, obj, dog), (dog, adj, brown), (dog, det, a). Similarly, for a Chinese sentence "国家颁布了计划" (In English, "The nation has issued the plan"), a dependency parser can get a set of dependency triples as illustrated in FIG. 4-2. The standard expression of the dependency parsing result is: (颁布, sub, 国家), (颁布, obj, 计划),(颁布, comp, 了).

Figures 1, 5:
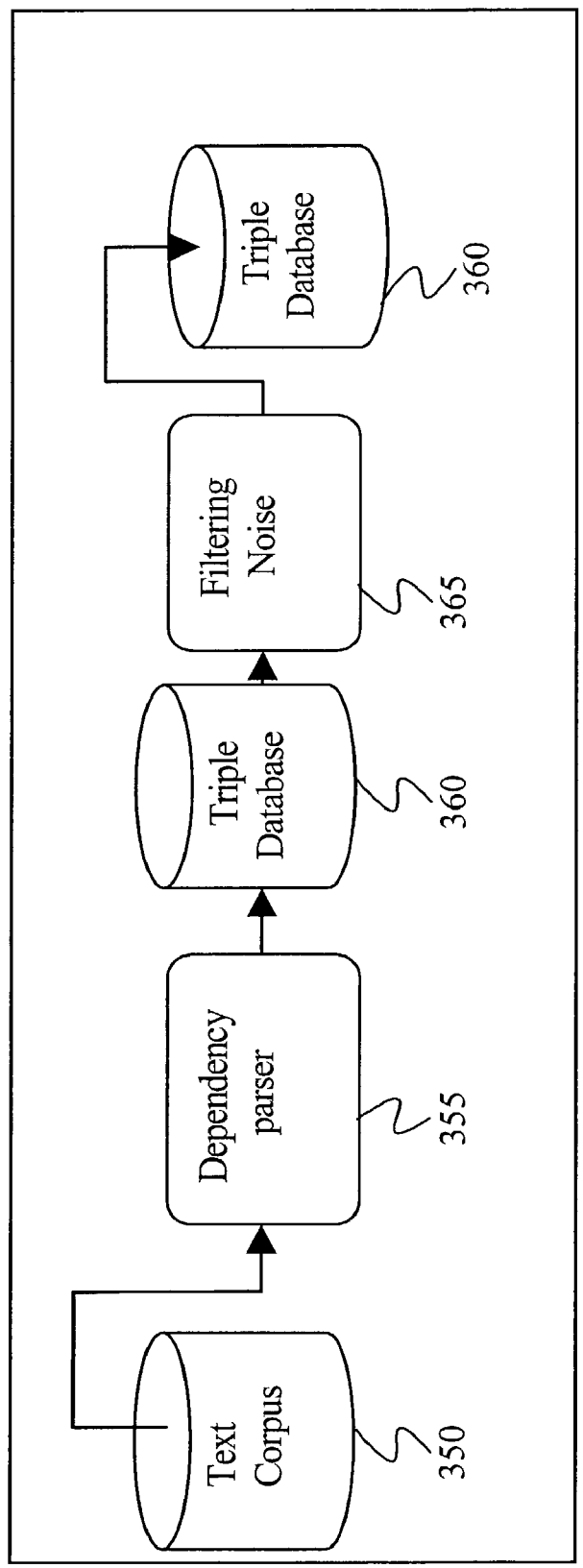
Figures 2, 5:
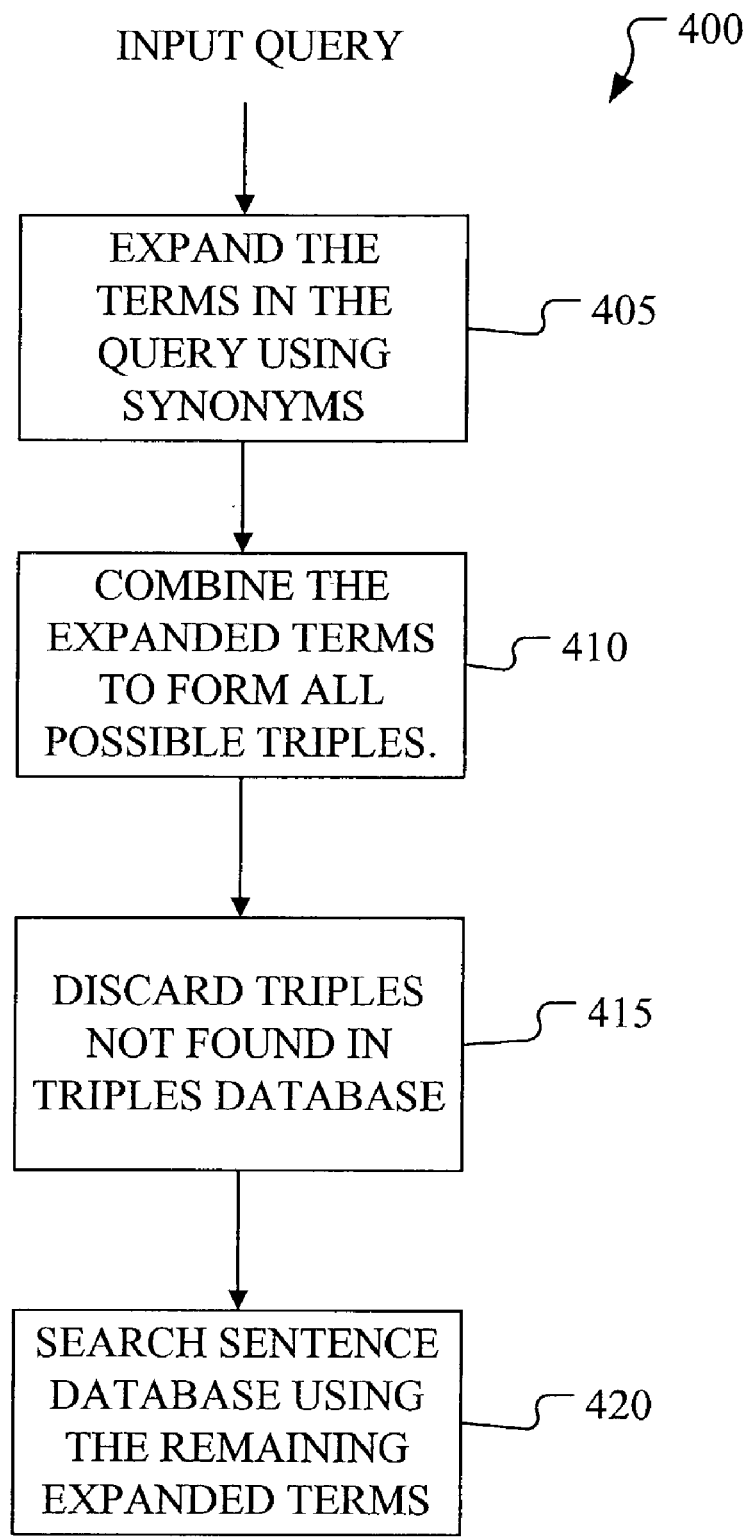
Figure 8:
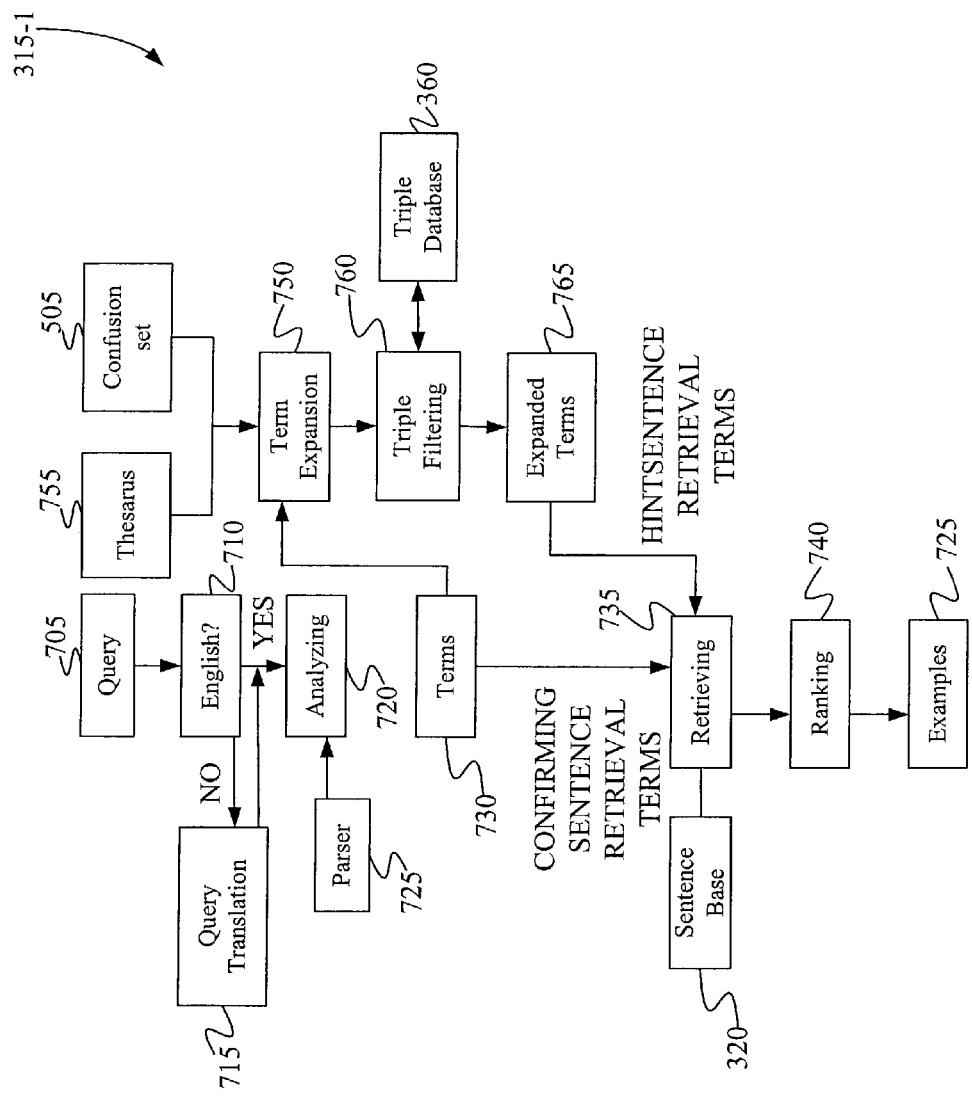
FIG. 8 is a block diagram illustrating one embodiment of the search engine shown in FIG. 3.

In some embodiments, the search engine 315 of the present invention utilizes a dependency triples database 360 to expand the search terms of the main dependency triples extracted from the query. Thus, the dependency triples database can be included in, or coupled to, either of query processing component 310 and search engine 315. FIG. 5-1 illustrates a method of creating the dependency triples database 360. FIG. 8 described later illustrates the search engine coupled to the triples database 360.

As shown in FIG. 5-1, each sentence from a text corpus is parsed by a dependency parser 355 and a set of dependency triples is generated. Each triple is put into a triple database 360. If an instantiation of a triple has already existed in the triple database 360, the frequency of this triple increases. After all the sentences are parsed, a triples database including thousands of triples has been created. Since the parser may not be 100% correct, some parsing mistakes can be introduced at the same time. If desired, a filter component 365 can be used to remove the noisy triples introduced by the parsing mistakes, leaving only correct triples in the database 360.

Improve Retrieval Precision with NLP Technologies

In accordance with the present invention, search engine 315 utilizes one or both of two methods to improve the "confirming sentence" retrieval results. One method utilizes extended indexing terms. The other method utilizes a new ranking algorithm to rank the retrieved confirming sentences.

Extended Indexing Terms

Using conventional IR approaches, the search engine 315 would search sentence base 320 using only the lemma of the input query to define indexing units for the search. A "lemma" is the basic, uninflected form of a word, also known as its stem. To improve the search for confirming sentences in sentence database 320, in accordance with the present invention, the one or more of the following are added as indexing units in addition to the lemmas: (1) lemma words with part of speech (POS); (2) phrasal verbs; and (3) dependency triples.

For instance, consider an input query sentence: "The scientist presided over the workshop." Using a conventional IR indexing method, as in the baseline system defined above, only the lemmas are used as indexing units (i.e., the function words are removed as stop words). Table 1 illustrates the lemmas for this example input query sentence:

TABLE 1

| Lemma | scientist, preside, over, workshop |
|---|---|

Using the extended indexing method of the present invention, for the same example sentence, the indexing terms illustrated in Table 2 are also employed in the database search by search engine 315:

TABLE 2

| Lemma | scientist, preside, over, workshop |
|---|---|
| Lemma with POS | scientist_noun, workshop_noun, preside_verb |
| Phrasal verb | preside~over |
| Dependency triples | preside~Dobj~workshop |

While one or more of the possible extended indexing units (lemma words with POS, phrasal verbs, and dependency triples) can be added to the lemma indexing units, in some embodiments of the invention advantageous results are obtained by adding all three types of extended indexing units to the lemma indexing units. The confirming sentences retrieved from sentence database 320 by search engine 315 using the extended indexing units for the particular input query are then ranked using a new ranking algorithm.

Ranking Algorithm

After search engine 315 retrieves a number of confirming sentences from the database, for example using the extended indexing units method described above or other methods, the confirming sentences are ranked to determine the sentences which are the most grammatically or structurally similar to the input query. Then, using output 325, one or more of the confirming sentences are displayed to the user, with the highest ranking (most similar) confirming sentences being provided first or otherwise delineated as being most relevant. For example, the ranked confirming sentences can be displayed as a numbered list, as shown by way of example in FIG. 3.

In accordance with embodiments of the present invention, a ranking algorithm ranks the confirming sentences based upon their respective similarities Sim(Di, Qj) with the input query. The ranking algorithm similarity computation is performed using the relationship shown in Equation 6:

$$Sim\,(D_i,\,Q_j) = \frac{\sum_k (d_{ik} * q_{jk} * W_{jk})}{f(Li)} \quad \text{Equation 6}$$

Where,
Di is the vector weight representation of the $i^{th}$ confirming sentence (see Equation 1 above) $D_i$->$(d_{i1}, d_{i2}, \ldots, d_{im})$;
Qj is the vector weight representation of the input query $Q_j$->$(Q_{j1}, Q_{j2}, \ldots, Q_{jm})$;
$L_i$ is the sentence length of $D_i$;
$f(L_i)$ is a sentence length factor or function of $L_i$ (for example, $f(L_i)=L_i^2$); and
$W_{jk}$ is the linguistic weight of term $q_{jk}$.

The linguistic weights for different parts of speech in one example embodiment are provided in the second column of Table 3. The present invention is not limited, however, to any specific weighting.

TABLE 3

| | |
|---|---|
| Verb-Obj | 10 |
| Verbal phrase | 8 |
| Verb | 6 |
| Adj/Adv | 5 |
| Noun | 4 |
| Others | 2 |

Compared with conventional IR ranking algorithms, for example as shown above in Equation 4, the ranking algorithm of the present invention which uses the similarity relationship shown in Equation 6 includes two new features which better reflect the linguistic significance of the confirming sentence relative to the input query. One is the linguistic weight, $W_{jk}$ of terms in the query $Q_j$. For example, the verb-object dependency triples can be assigned the highest weight, while verbal phrases, verbs, etc. are respectively assigned different weights, each reflecting the importance or significance of the particular type of term, sentence component or POS relation in choosing relevant confirming sentences.

It is believed that users pay more attention to issues reflecting sentence structure and word combinations. For instance, they focus more on verbs than on nouns. Therefore, the linguistic weights can be assigned to retrieve confirming example sentences having the particular type of term, sentence component or POS relation deemed to be most important for a typical user.

The second feature added to the similarity function is the sentence length factor or function $f(L_i)$. The intuition used in one embodiment is that the shorter sentences should be ranked higher than the longer sentences in the same condition. The example sentence length factor or function $f(L_i)=L_i^2$ is but one possible function which will aid in ranking the confirming sentences at least partially based upon length. Other functions can also be used. For example, other exponential length functions can be used. Furthermore, in other embodiments, the length factor can be chosen such that longer confirming sentences are ranked higher, if doing so was deemed advantageous.

While the two new features ($W_{jk}$ and $f(L_i)$) used in this particular similarity ranking algorithm can be applied together as shown in Equation 6 to improve confirming sentence retrieval, in other embodiments each of these features can be used without the other feature. In other words, similarity ranking algorithms Sim(Di, Qj) such as those shown in Equations 7 and 8 can be used instead.

$$Sim\,(D_i,\,Q_j) = \frac{\sum_k (d_{ik} * q_{jk})}{f(Li)} \quad \text{Equation 7}$$

$$Sim\,(D_i,\,Q_j) = \sum_k (d_{ik} * q_{jk}) * W_{jk} \quad \text{Equation 8}$$

Improved Retrieval of Hint Sentence

In system 300, search engine 315 improves hint sentence retrieval using a query expansion method of the present invention. The query expansion method 400 is illustrated generally in the block diagram of FIG. 5-2. The query expansion method provides alternative expressions for use in searching the sentence database 320.

The expansion procedure is as follows: First, as illustrated at 405, we expand the terms in the query using synonyms defined in a machine readable thesaurus, for example such as WordNet. This method is often used in query expansion in conventional IR systems. Alone however, this method suffers from the problem of noisy expansions. To avoid the problem of noisy expansions, method 400 used by search engine 315 implements additional steps 410 and 415 before searching the sentence database for hint sentences.

As illustrated at 410, the expanded terms are combined to form all possible triples. Then, as illustrated at 415, all of the possible triples are checked against the dependency triple database 360 shown in FIGS. 5-1 and 8. Only those triples which have ever appeared in the triple database are selected as expanded query terms. Those expanded triples which are not found in the triple database are discarded. Then, the sentence database is searched for hint sentences using the remaining expanded terms as shown at 420.

For example:
Query: I will take the job
Synset: take|accept|acquire|admit|aim|ask|...
Triples in triple database: accept~Dobj~job,
Remaining Expanded Terms: accept~Dobj~job Confusion Method of Hint Sentence Retrieval Sometimes, a user may input a query using a mix of words from a first language and grammatical structure from a second language. For example, a Chinese user writing in English may enter a query in what is commonly referred to as "Chinese-like English". In some embodiments of the present invention, search engine 315 is designed to detect the user's intention before searching the sentence database for hint sentences. The search engine can detect the user's intention using either or both of two methods.

Figures 1, 6:
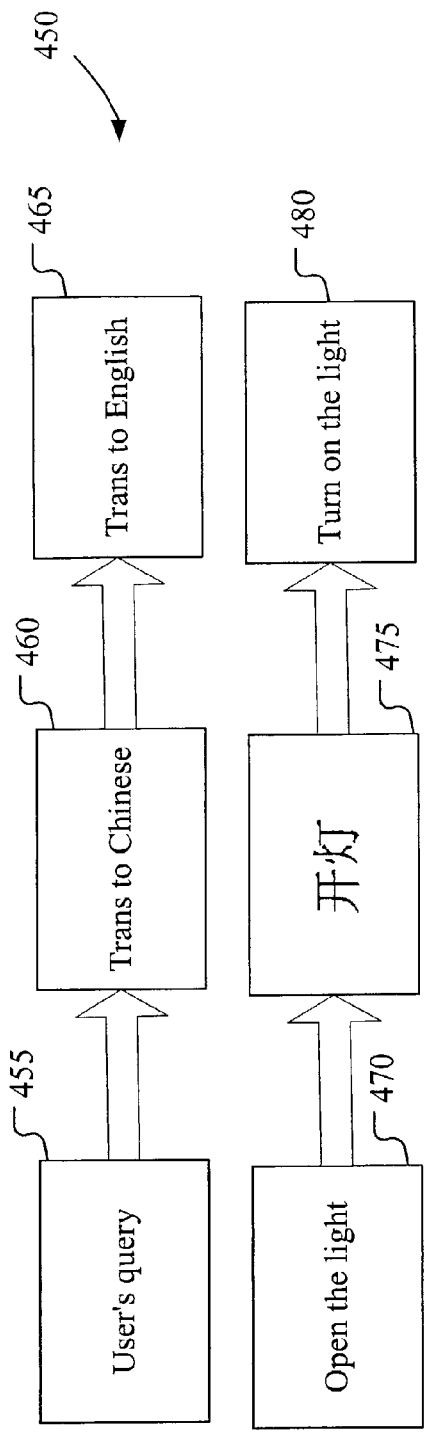
Figures 2, 6:
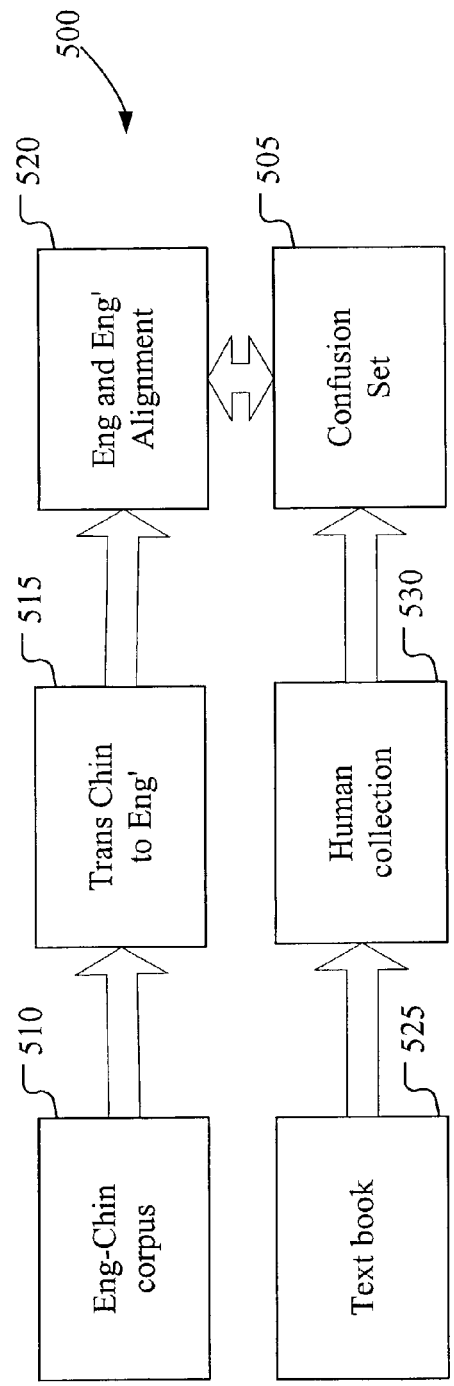
Figures 3, 6:
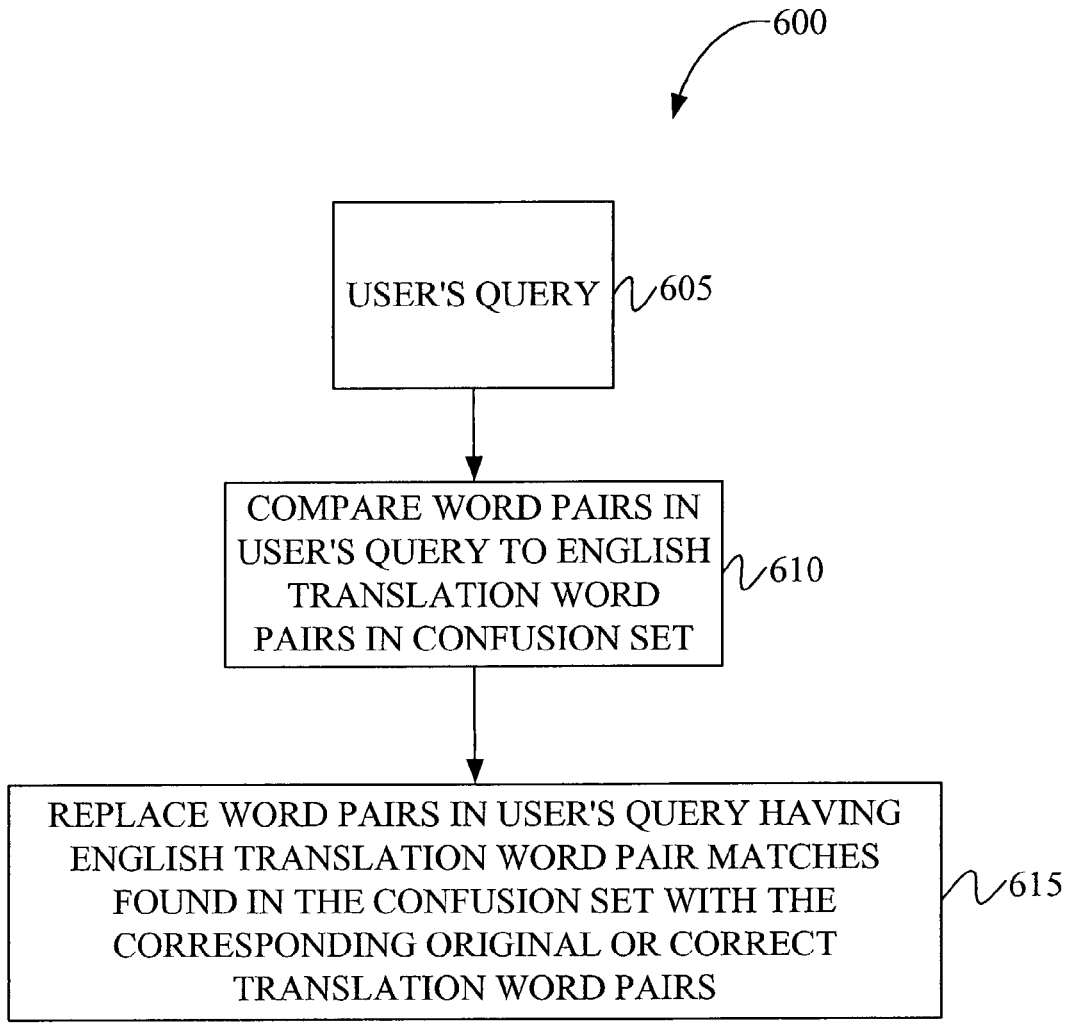

A first method 450 of detecting the user's intention is illustrated in FIG. 6-1 with an example. This is known as the translation method. Using this method, the user's query is received as shown at 455, and is translated from the first language (with second language grammar, structure, collocation, etc.) into the second language as shown at 460. As shown at 465, the query is then translated from the second language back into the first language. By way of example, steps 460 and 465 are shown with respect to the Chinese and English languages. However, it must be noted that these steps are not limited to any particular first and second languages.

In this first example, the input query shown at 470 and corresponding to step 455 is a Chinese-like English query, "Open the light", which contains a common collocation mistake. As shown at 475 and corresponding to step 460, the Chinese-like English query is translated into the Chinese query "开灯". Then, as shown at 480 corresponding to step 465, the Chinese query is translated back into the English language query "Turn on the light," which does not contain the collocation mistake of the original query. This method is used to imitate the user's thinking behavior, but it requires an accurate translation component. Method 450 may create too much noise if the translation quality is poor. Therefore, the method 500 illustrated in FIG. 6-2 can be used instead.

A second method, which is referred to herein as "the confusion method," expands word pairs in the users query using a confusion set database. This method is illustrated in FIG. 6-3, while a method of constructing the confusion set database is illustrated in FIG. 6-2. A confusion set is a database containing word pairs that are confusing, such as "open/turn on". This can include collocations between words, single words that are confusing to translate, and other confusing word pairs. Generally, the word pairs will be in the same language, but can be annotated to a translation word if desired.

Referring first to FIG. 6-2, shown is a method 500 of constructing a confusion set database 505 for use by search engine 315 in detecting the user's intentions. The collection of the confusion set, or construction of the confusion set database 505, can be done with the aid of a word and sentence aligned bilingual corpus 510. In the example used herein, corpus 510 is an English-Chinese bilingual corpus. At shown at 515, the method includes the human translation of Chinese word pairs into English language word pairs (human translation designated as Eng'). The English translation word pairs Eng' are then aligned with the correct English translation word pairs (designated as Eng) as shown at 520. This alignment is possible because the correct translations were readily available in the original bilingual corpus. At this point, sets of word pairs are defined which correlate, for a particular Chinese word pair, the English translation to the English original word pair (correct translation word pair as defined by its alignment in the bilingual corpus):

{English translation, English original}

Any set of word pairs, {English translation, English original} or {Eng', Eng}, in which the translation word pair and the original word pair are the same is identified and removed from the confusion set. Those sets for which the English translation is not the same as the English original remain in the confusion set database 505. The confusion set can also be expanded by adding some typical confusion word pairs as defined in a text book 525 or existing in a personal collection 530 of confusing words.

FIG. 6-3 illustrates a method 600 of determining the user's intentions by expands word pairs in the user's query using the confusion set database 505. As illustrated at 605, the user's query is received at an input component. Word pairs in the user's query are then compared to word pairs in the confusion set database as shown at comparison component 610 of the search engine. Generally, this will be a comparison of the English language word pairs in the user's query to the corresponding human translated word pairs, Eng', in the database. Word pairs in the user's query which have matching entries Eng' in the confusion set database are then replaced with the original word pair, Eng, from that set as shown at query expansion component or step 615. In other words, they are replaced with the correct translation word pair. A sentence retrieval component of the search engine 315 then searches the sentence database 320 using the new query created using the confusion set database. Again, while the confusion set methods have been discussed with reference to English word pairs written by a native Chinese speaking person, these methods are language independent and can be applied to other language combinations as well.

Query Translation

Figure 7:
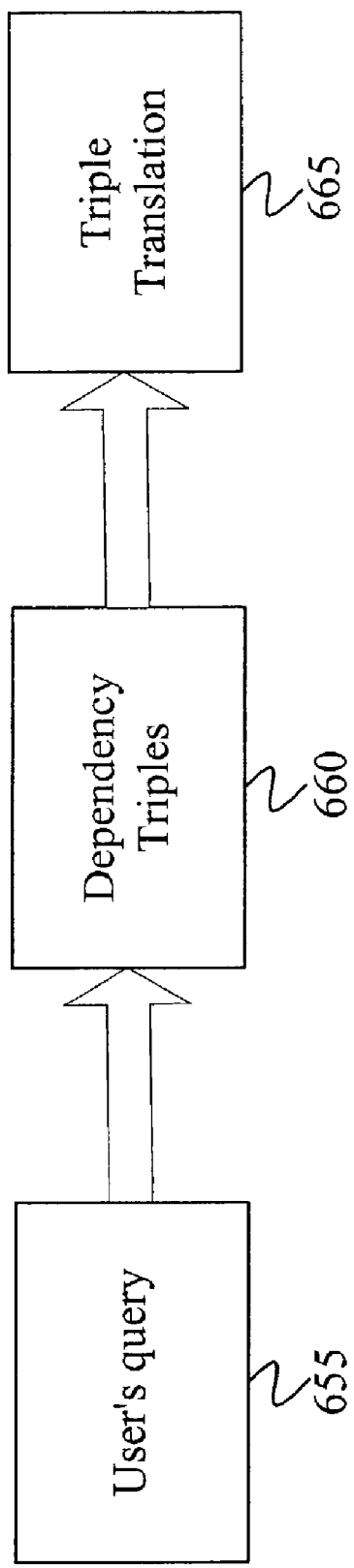
FIG. 7 is a block diagram illustrating a query translation method of improving the retrieval of sentences.

Search engine 315 also uses query translation to improve the retrieval of sentences as shown in FIG. 7. Given a user's query (shown at 655), the key dependency triples are extracted with a robust parser as shown at 660. The triples are then translated one by one as shown at 665. Finally, all of the translations of the triples are used as the query terms by search engine 315.

Suppose we want to translate a Chinese dependency triple $c=(w_{C1}, rel_C, w_{C2})$ into an English dependency triple $e=(e_{E1}, rel_E, w_{E2})$. This is equivalent to finding $e_{max}$ that will maximize the value $P(e|c)$ according to a statistical translation model.

Using Bayes' theorem, we can write:

$$P(e \mid c) = \frac{P(e)P(c|e)}{P(c)} \quad \text{Equation 9}$$

Since the denominator $P(c)$ is independent of $e$ and is a constant for a given Chinese triple, we have:

$$e_{max} = \underset{e}{\mathrm{argmax}}(P(e)P(c|e)) \quad \text{Equation 10}$$

Here, the $P(e)$ factor is a measure of the likelihood of the occurrence of a dependency triple $e$ in the English language. It makes the output of $e$ natural and grammatical. $P(e)$ is usually called the language model, which depends only on the target language. $P(c|e)$ is usually called the translation model.

In single triple translation, $P(e)$ can be estimated using MLE (Maximum Likelihood Estimation), which can be rewritten as:

$$P_{MLE}(w_{E1}, rel_E, w_{E2}) = \frac{f(w_{E1}, rel_E, w_{E2})}{f(*,*,*)} \quad \text{Equation 11}$$

In addition, we have:

$$P(c|e)=P(w_{C1}|rel_C, e) \times P(w_{C2}|rel_C, e) \times P(rel_C|e) \quad \text{Equation 12}$$

$P(rel_C|e)$ is a parameter which mostly depends on specific word. But this can be simplified as:

$$P(rel_C|e)=P(rel_C|rel_E) \quad \text{Equation 13}$$

According to our assumption of correspondence between Chinese dependency relations and English dependency relations, we have $P(rel_C|rel_E) \approx 1$. Furthermore, we suppose that the selection of a word in translation is independent of the type of dependency relation, therefore we can assume that $w_{C1}$ is only related to $w_{E1}$, and that $w_{C2}$ is only related to $w_{E2}$. The word translation probability $P(c|e)$ can be estimated with a parallel corpus.

Then we have:

$$\begin{aligned} e_{max} &= \underset{e}{\operatorname{argmax}}(P(e) \times P(c|e)) \quad \text{Eqauation 14} \\ &= \underset{e}{\operatorname{argmax}}(P(e) \times P(c|e)) \\ &= \underset{w_{E1}, w_{E2}}{\operatorname{argmax}}(P(e) \times P(w_{C1}|w_{E1}) \times P(w_{C2}|w_{E2})) \end{aligned}$$

Therefore, given a Chinese triple, the English translation can be obtained with this statistical approach.

Overall System

FIG. 8 is a block diagram illustrating an embodiment 315-1 of search engine 315 which includes the various confirming and hint sentence retrieval concepts disclosed herein. Although the search engine embodiment 315-1 shown in FIG. 8 utilizes a combination of the various features disclosed herein to improve confirming and hint sentence retrieval, as discussed above, other embodiments of search engine 315 include only one of these features, or various combinations of these features. Therefore, the search engine of the present invention must be understood to include every combination of the above-described features.

As shown n FIG. 8 at 705, an input query is received by search engine 315-1. As shown at 710, search engine 315-1 includes a language determining component which determines whether the query is in English (or more generally in the first language). If the query is not in English (or the first language), for example if the query is in Chinese, the query is translated into English or the first language as shown at query translation module or component 715. Query translation module or component 715 uses, for example, the query translation method described above with reference to FIG. 7 and Equations 10–14.

If the query is in English or the first language, or after translation of the query to English or the first language, an analyzing component or step 720 uses a parser 725 to obtain the parsing results represented in dependency triple form (that is logical form). In embodiments in which the user is writing in English, the parser is an English parser such as NLPWin developed by Microsoft Research Redmond, though other known parsers can be used as well. After obtaining these terms 730 pertaining to the query, a retrieving component 735 of search engine 315-1 retrieves sentences from sentence base 320. For confirming sentence retrieval, retrieval of the sentences includes retrieval using the expanded indexing terms method described above. The retrieved sentences are then ranked using a ranking component or step 740, for example using the ranking method described with reference to Equations 6–8, and provided as examples at 745. This process realizes the confirming sentence retrieval.

To retrieve hint sentences, the terms list is expanded using an expansion component or step 750. Term expansion is carried out using either of two resources, a thesaurus 755 (as discussed above with reference to FIG. 5-2) and the confusion set 505 (as discussed above with reference to FIGS. 6-2 and 6-3). Then, the expanded terms are filtered using a filtering component or step 760 with triple database 360 as described above, for example with reference to FIG. 5-2. The result is a set of expanded terms 765 which also exist in the triples database. The expanded terms are then used by the retrieving component 735 to retrieve hint sentences for examples 745. The hint sentences can be ranked at 740 in the same manner as the confirming sentences. In an interactive search mode, if the retrieved sentences are not satisfactory, the user can highlight the words he or she wishes to focus on, and searches again.

Although the present invention has been described with reference to particular embodiments, workers skilled in the art will recognize that changes may be made in form and detail without departing from the spirit and scope of the invention. For example, examples described with reference to English language writing by a Chinese speaking person are applicable in concept to writing in a first language by a person whose native language is a second language which is different from the first language. Also, where reference is made to identifying or storing a translation word in a first language for a word in a second language, this reference includes identifying or storing phrases in the first language which correspond to the word in the second language, and identifying or storing a word in the first language which corresponds to a phrase in the second language.

What is claimed is:

1. A computer-implemented method of providing to a user sentences from a sentence database, stored on a computing device, in response to a query, the method comprising:
    receiving the query;
    defining indexing units based upon the query, the indexing units including both lemma from the query and extended indexing units associated with the query;
    retrieving a plurality of sentences from the sentence database stored on the computing device using the defined indexing units as search parameters;
    determining a similarity between each of the plurality of retrieved sentences and the query, wherein each similarity is determined as a function of a linguistic weight of a term in the query and as a function of a sentence length factor which is an exponential function of a length of a corresponding one of the plurality of retrieved sentences; and
    ranking the plurality of retrieved sentences based upon the determined similarities.

2. The method of claim 1, wherein the linguistic weight of the term in the query is a weight assigned to the term in the query as a function of its part of speech.

3. The method of claim 2, wherein determining the similarity between each of the plurality of retrieved sentences and the query further comprises determining each similarity as a function of linguistic weights of a plurality of terms in the query.

4. The method of claim 3, wherein determining the similarity between each of the plurality of retrieved sentences and the query further comprises determining each similarity as a function of vector weights of each of the plurality of terms in the query and linguistic weights of each of the plurality of terms in the query.

5. The method of claim 4, wherein the vector weights of each of the plurality of terms in the query are determined as a function of an occurrence frequency of the respective term in the query.

6. The method of claim 5, wherein the vector weights of each of the plurality of terms in the query are determined as a function of occurrence frequencies of the respective terms in the sentence database.

7. The method of claim 6, wherein determining the similarity between each of the plurality of retrieved sentences and the query further comprises determining the similarity for a particular retrieved sentence as a function of vector weights of each of a plurality of terms in the particular sentence, the vector weights of each of the plurality of terms in the query and the linguistic weights of each of the plurality of terms in the query.

8. The method of claim 7, wherein the vector weights of each of the plurality of terms in the particular retrieved sentence are determined as a function of occurrence frequencies of the respective terms in the particular retrieved sentence.

9. The method of claim 8, wherein the vector weights of each of the plurality of terms in the particular retrieved sentence are determined as a function of occurrence frequencies of the respective terms in the sentence database.

10. The method of claim 9, wherein determining the similarity between each of the plurality of retrieved sentences and the query further comprises determining the similarity for the particular retrieved sentence as a function of inner products of the vector weights of the plurality of terms in the query, the vector weights of the plurality of terms in the particular retrieved sentence, and the linguistic weights of each of the plurality of terms in the query.

11. The method of claim 1, wherein defining the indexing units based upon the query further comprises:
defining the indexing units to include both the lemma from the query and lemma from the query with their corresponding parts of speech.

12. The method of claim 1, wherein defining the indexing units based upon the query further comprises:
defining the indexing units to include both the lemma from the query and phrasal verbs from the query.

13. The method of claim 1, wherein defining the indexing units based upon the query further comprises:
defining the indexing units to include both the lemma from the query and dependency triples corresponding to the query.

14. The method of claim 1, wherein defining the indexing units based upon the query further comprises:
defining the indexing units to include the lemma from the query, lemma from the query with their corresponding parts of speech, phrasal verbs from the query, and dependency triples corresponding to the query.

15. A tangible computer readable medium having computer-executable instructions for performing a method of providing to a user sentences from a sentence database, stored on a computing device, in response to a query, the method having steps comprising:
receiving the query;
defining indexing units based upon the query, the indexing units including both lemma from the query and extended indexing units associated with the query; and
retrieving a plurality of sentences from the sentence database, stored on the computing device, using the defined indexing units as search parameters;
determining a similarity between each of the plurality of retrieved sentences and the query, wherein each similarity is determined as a function of vector weights of each of the plurality of terms in the query and linguistic weights of each of the plurality of terms in the query, and wherein the vector weights of each of the plurality of terms in the query are determined as a function of occurrence frequencies of the respective terms in the sentence database, and wherein each similarity is further determined as a function of a sentence length factor which is an exponential function of a length of a corresponding one of the plurality of retrieved sentences;
ranking the plurality of retrieved sentences based upon the determined similarities; and outputting to the user sentences from the plurality of retrieved sentences based upon the ranking.

16. A system for retrieving confirming sentences from a sentence database in response to a query, the system comprising:
an input component which receives the query as an input; and
a search engine coupled to the input component, the search engine configured to define indexing units based upon the query, the indexing units including both lemma from the query and extended indexing units associated with the query, the search engine retrieving a plurality of confirming sentences from the sentence database using the defined indexing units as search parameters, the search engine further configured to determine a similarity between each of the plurality of retrieved confirming sentences and the query, wherein each similarity is determined as a function of a sentence length factor which is an exponential function of a length of a corresponding one of the plurality of retrieved sentences, the search engine ranking the plurality of retrieved confirming sentences based upon the determined similarities.

17. The system of claim 16, wherein the search engine is configured to define the indexing units to include both the lemma from the query and lemma from the query with their corresponding parts of speech.

18. The system of claim 16, wherein the search engine is configured to define the indexing units to include both the lemma from the query and phrasal verbs from the query.

19. The system of claim 16, wherein the search engine is configured to define the indexing units to include both the lemma from the query and dependency triples corresponding to the query.

20. The system of claim 16, wherein the search engine is configured to define the indexing units to include the lemma from the query, lemma from the query with their corresponding parts of speech, phrasal verbs from the query, and dependency triples corresponding to the query.

* * * * *